United States Patent
Ferrari et al.

(10) Patent No.: US 8,112,994 B2
(45) Date of Patent: Feb. 14, 2012

(54) METHOD OF CONTROLLING A TURBOCHARGER HAVING A VARIABLE-GEOMETRY MECHANISM AND A WASTE GATE

(75) Inventors: Sebastian Ferrari, Thaon Les Voges (FR); Eduardo Massart, Igney (FR); Alain Lombard, Thaon Les Vosges (FR); Jerome Mitka, Thaon Les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 890 days.

(21) Appl. No.: 12/089,759

(22) PCT Filed: Oct. 12, 2005

(86) PCT No.: PCT/US2005/036621
§ 371 (c)(1),
(2), (4) Date: Jul. 7, 2008

(87) PCT Pub. No.: WO2007/046783
PCT Pub. Date: Apr. 26, 2007

(65) Prior Publication Data
US 2008/0282698 A1    Nov. 20, 2008

(51) Int. Cl.
F02D 23/00    (2006.01)
(52) U.S. Cl. .................................................. 60/602
(58) Field of Classification Search ............. 60/602, 60/612
See application file for complete search history.

(56) References Cited

U.S. PATENT DOCUMENTS

| | | | | | |
|---|---|---|---|---|---|
| 4,685,302 | A | * | 8/1987 | Abo et al. ...................... | 60/602 |
| 4,702,080 | A | * | 10/1987 | Ueno et al. .................... | 60/602 |
| 4,732,003 | A | * | 3/1988 | Ueno et al. .................... | 60/602 |
| 4,745,753 | A | | 5/1988 | Tadokoro et al. .............. | 60/602 |

(Continued)

FOREIGN PATENT DOCUMENTS

| | | |
|---|---|---|
| DE | 10132672 A1 | 1/2003 |
| WO | 9900589 | 1/1999 |
| WO | WO 2005073536 A1 * | 8/2005 |

OTHER PUBLICATIONS

A Fully Certified English Translation of Koichi Akita (JP 09-053457 A), published on Feb. 25, 1997.*

(Continued)

*Primary Examiner* — Thai Ba Trieu
(74) *Attorney, Agent, or Firm* — Alston & Bird LLP

(57) ABSTRACT

A method for controlling a variable-geometry turbine (24) that includes a variable-geometry mechanism that is movable between a fully closed position closing a relatively greater portion of the turbine nozzle and a fully open position closing a relatively smaller portion of the nozzle. The turbine (24) further comprises a waste gate (40) movable between a closed position and an open position in which some of the exhaust gas bypasses the turbine (24). At low engine speeds, turbocharger boost us regulated by regulating the position of the wastegate. At high engine speeds, the variable geometry is fully open and the wastegate is opened again. When at medium engine speeds, the variable geometry mechanism is to be moved from its closed position toward its fully open position, the waste gate (40) is in an open position to cause a proportion of the exhaust gas to bypass the turbine (24) and thereby reduce the pressure of the exhaust gas in the chamber. While this reduced pressure of the exhaust gas is in effect, the variable-geometry mechanism is moved from the fully closed position toward the fully open position while simultaneously the waste gate begins to close.

9 Claims, 2 Drawing Sheets

U.S. PATENT DOCUMENTS

| | | | | |
|---|---|---|---|---|
| 4,763,476 A | * | 8/1988 | Hirabayashi | 60/602 |
| 5,996,347 A | * | 12/1999 | Nagae et al. | 60/602 |
| 6,715,288 B1 | | 4/2004 | Engels et al. | 60/602 |
| 7,644,586 B2 | * | 1/2010 | Yamagata | 60/612 |
| 2005/0188682 A1 | * | 9/2005 | Fledersbacher et al. | 60/284 |
| 2006/0070381 A1 | * | 4/2006 | Parlow et al. | 60/612 |

OTHER PUBLICATIONS

A Fully Certified English Translation of Schmidt et al. (DE 101 32 672 A1), published on Jan. 16, 2003.*

PCT/ ISR-WO, 2007/0746783 A1, actual completion of the International Search dated on Jun. 9, 2006.

* cited by examiner

METHOD OF CONTROLLING A TURBOCHARGER HAVING A VARIABLE-GEOMETRY MECHANISM AND A WASTE GATE

BACKGROUND OF THE INVENTION

The present invention relates to turbochargers having a variable-geometry mechanism for regulating the flow area of the nozzle leading into the turbine, and having a waste gate for causing exhaust gas to bypass the turbine under certain conditions.

In turbochargers of the above-described type, the variable-geometry mechanism (which can comprise a sliding piston or slide vane, or variable vanes in the nozzle, or the like) is typically movable between a fully closed position and a fully open position. In the fully closed position, the nozzle is significantly closed (and in some cases completely closed) by the mechanism. In the fully open position of the piston, the nozzle is significantly open (and in some cases completely open).

The variable-geometry mechanism can be difficult to control at the very beginning of the opening process. When the mechanism is opened just slightly from its fully closed position, it can create a significant amount of disturbance in the exhaust gas flow into the turbine, thereby decreasing efficiency of the turbocharger.

BRIEF SUMMARY OF THE INVENTION

The present invention addresses the above needs and achieves other advantages by providing a method for controlling a variable-geometry turbocharger having a turbine wheel mounted for rotation in a turbine housing, the turbine housing defining a chamber surrounding the turbine wheel for receiving exhaust gas from an engine and further defining a nozzle leading from the chamber generally radially inwardly to the turbine wheel through which exhaust gas flows from the chamber to the turbine wheel. The turbine includes a variable-geometry mechanism movable to regulate flow through the nozzle. The turbine further comprises a waste gate movable between a closed position in which substantially all of the exhaust gas is directed from the engine through the turbine nozzle to the turbine wheel and a plurality of open positions for allowing a variable proportion of the exhaust gas to bypass the turbine. The turbine further comprises a variable-geometry actuator operable to move the variable-geometry mechanism to regulate flow through the nozzle and a waste gate actuator operable to move the waste gate between the closed and open positions.

In accordance with the invention, at low engine speeds, turbocharger boost is regulated by regulating the position of the waste gate, while the variable-geometry mechanism is in its most-closed position (in which flow is still able to pass through the turbine). At intermediate engine speeds, boost is regulated by regulating the position of the variable-geometry mechanism, while the waste gate is closed or substantially closed. At high engine speeds, once again the boost is regulated by regulating the position of the waste gate, while the variable-geometry mechanism is open or substantially open.

In preferred embodiments of the invention, there is a transition region between the low-speed regime and the intermediate-speed regime. As speed increases through the transition region such that the variable-geometry mechanism is to be opened, the waste gate is positioned in a relatively open position and the variable-geometry mechanism begins to open while simultaneously the waste gate begins to close. It is thought that the open position of the waste gate reduces the pressure of the exhaust gas in the chamber and thereby reduces the amount of flow disturbance that occurs as the variable-geometry mechanism begins to open.

In other preferred embodiments of the invention, there is a second transition region between the intermediate-speed regime and the high-speed regime. As speed increases through the second transition region, the variable-geometry mechanism is in a relatively open position and the waste gate begins to open.

In some embodiments, the variable-geometry mechanism comprises a sliding piston. The turbine can include vanes mounted in the nozzle. When a sliding piston is employed, the vanes can be of fixed geometry. Alternatively, the piston can be omitted and variable-geometry vanes can be employed as the variable-geometry mechanism.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
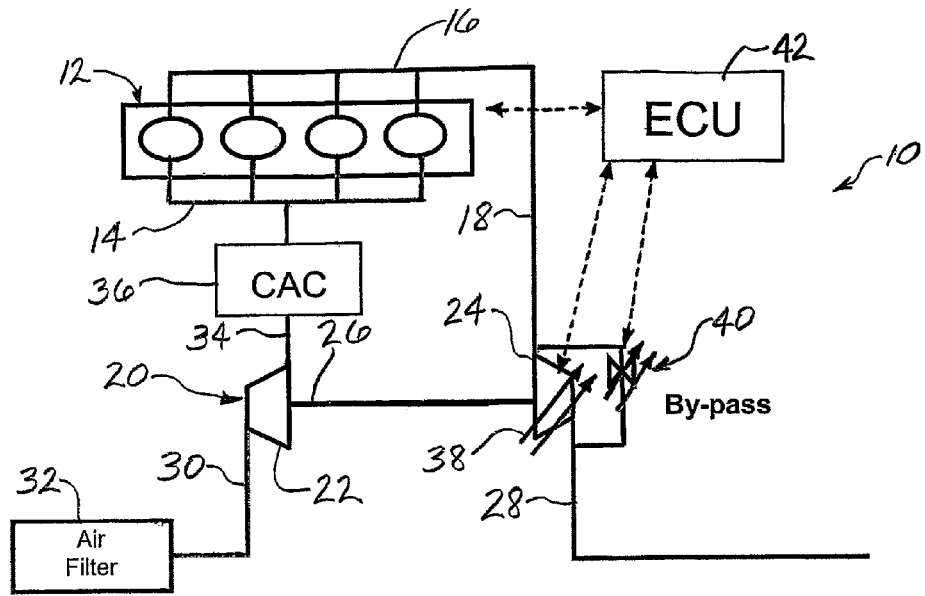
FIG. 1 is a schematic diagram of an engine and turbocharger system in accordance with one embodiment of the invention.

An engine and turbocharger system 10 in accordance with one embodiment of the invention is depicted in diagrammatic fashion in FIG. 1. The system comprises an internal combustion engine 12 that is supplied with a mixture of fuel and air via an intake manifold 14 and exhausts the products of combustion, referred to as "exhaust gas", via an exhaust manifold 16. In a popular alternate arrangement, fuel can be supplied directly to each cylinder, though this will not affect the applicability of the present invention. The exhaust manifold is connected to an exhaust conduit 18. The system further comprises a turbocharger 20. The turbocharger comprises a compressor 22 and a turbine 24 mounted on a common shaft 26. The turbine is supplied with exhaust gas from the exhaust conduit 18, and expands the exhaust gas (which is at relatively high pressure and temperature) so as to extract mechanical power from the exhaust gas, after which the expanded exhaust gas is discharged from the turbine via an exhaust gas discharge 28. The turbine rotatably drives the shaft 26 and thus drives the compressor 22. The compressor draws in ambient air through a compressor inlet 30; typically the air is first passed through an air filter 32 to remove particulate matter that could damage the compressor. The compressor compresses the air to a higher pressure and discharges the pressurized air (also called "charge air") through a charge air conduit 34. It is frequently advantageous to pass the charge air through a charge air cooler (CAC) 36 to reduce the temperature of the charge air before it is supplied to the engine intake manifold 14.

The system 10 employs a turbine 24 that has variable geometry for regulating the flow of exhaust gas through the turbine. Such a turbine is referred to herein as a "variable-geometry turbine" or "VGT", but this generic term is intended to encompass turbines with any type in which a variable-geometry mechanism (illustrated diagrammatically by arrows 38 in FIG. 1) is used for regulating exhaust gas flow through the turbine. As non-limiting examples, the variable-geometry mechanism 38 can comprise an axially slidable piston or "slide vane" as known in the art, or an array of vanes in the turbine inlet, either of which mechanisms can be variably positioned under the control of a suitable actuator so as to control the sizes and configurations of exhaust gas flow passages leading into the turbine and thereby regulate flow.

The system 10 also comprises a "waste gate" or bypass valve 40 that is connected between the exhaust gas conduit 18 and the exhaust gas discharge 28 of the turbine. The waste gate comprises a controllable valve that is variably positionable for regulating flow rate through the valve. The waste gate is connected to a suitable actuator for positioning the valve. When the waste gate is fully closed, all of the exhaust gas in the exhaust gas conduit 18 flows through the turbine 24. When the waste gate is fully open, a substantial proportion of the exhaust gas in conduit 18 bypasses the turbine. At intermediate positions between the fully open and fully closed positions of the waste gate, a proportion of the exhaust gas flow, the magnitude of which is dependent on the valve position, bypasses the turbine.

The system 10 also comprises an engine control unit (ECU) 42 that is coupled with various components of the engine 12, with the actuator for the variable-geometry mechanism 38 of the turbine, and with the actuator for the waste gate 40. The ECU 42 comprises a programmed microprocessor with a storage or memory for data, operable to receive signals from various sensors associated with the engine 12, with the variable-geometry mechanism 38, and with the waste gate 40, and to execute programmed instructions, taking into account the signals from the sensors. In particular, the ECU is operable to control the positions of the variable-geometry mechanism and the waste gate based on the signals from the sensors, as further described below.

In accordance with the invention, the positions of the variable-geometry mechanism and the waste gate are controlled for regulating the "boost" provided by the compressor 22—i.e., the amount of pressurization of the charge air supplied to the engine intake manifold 14. The amount of boost determines the degree to which the power output from the engine is augmented relative to the power output that would be obtained with no boost. Generally it is desired that the engine power output vary in a smooth fashion throughout the engine operating envelope, and the attainment of this goal requires close control of the boost level to avoid sudden surges of power and the like.

Figure 2:
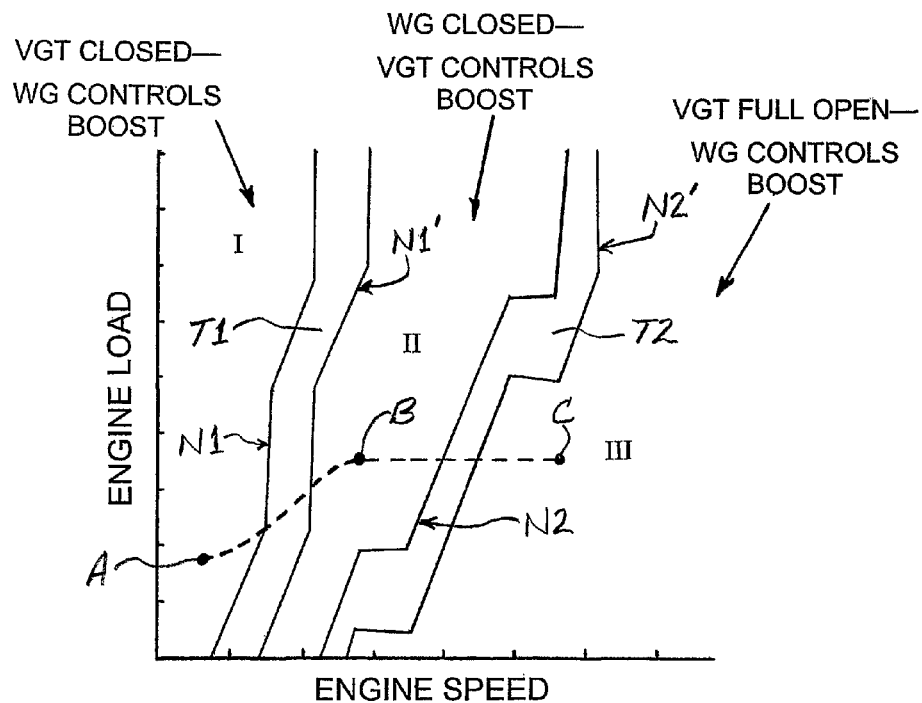
FIG. 2 is a graph schematically illustrating various engine operating regimes and the corresponding control strategies used therein in accordance with one embodiment of the invention.

In accordance with the invention, the positions of the variable-geometry mechanism and the waste gate are controlled in different ways depending on the operating regime in which the engine is operating. More particularly, the positions of the variable-geometry mechanism and the waste gate are dependent on engine load and engine speed. One embodiment of the invention is depicted in FIG. 2. The engine operating envelope is divided into three regimes: Regime I encompasses relatively low engine speeds; Regime II encompasses intermediate engine speeds; and Regime III encompasses relatively high engine speeds. There is a first transition region T1 between Regimes I and II, and a second transition region T2 between Regimes II and III.

In Regime I, where engine speed is relatively low, the flow rate of exhaust gas from the engine generally is fairly low. In this regime, the variable-geometry mechanism 38 is maintained in a "closed" position. In the closed position of the variable-geometry mechanism, exhaust gas is still able to flow through the turbine. Boost is regulated by controlling the position of the waste gate 40 so as to bypass a variable amount of exhaust gas around the turbine. Various control schemes can be used for regulating boost via control of the waste gate, and the invention is not limited in that respect.

In Regime II, at intermediate engine speeds, a larger amount of exhaust gas flow is produced by the engine in comparison with Regime I. In this regime, the waste gate 40 is closed so that little or no exhaust gas bypasses the turbine, and boost is regulated by controlling the position of the variable-geometry mechanism 38.

In Regime III, at high engine speeds, the exhaust gas flow rate from the engine is relatively high. Accordingly, in this regime, the variable-geometry mechanism is fully open so that as much flow as possible can pass through the turbine, and boost is regulated by controlling the position of the waste gate.

Figure 3:
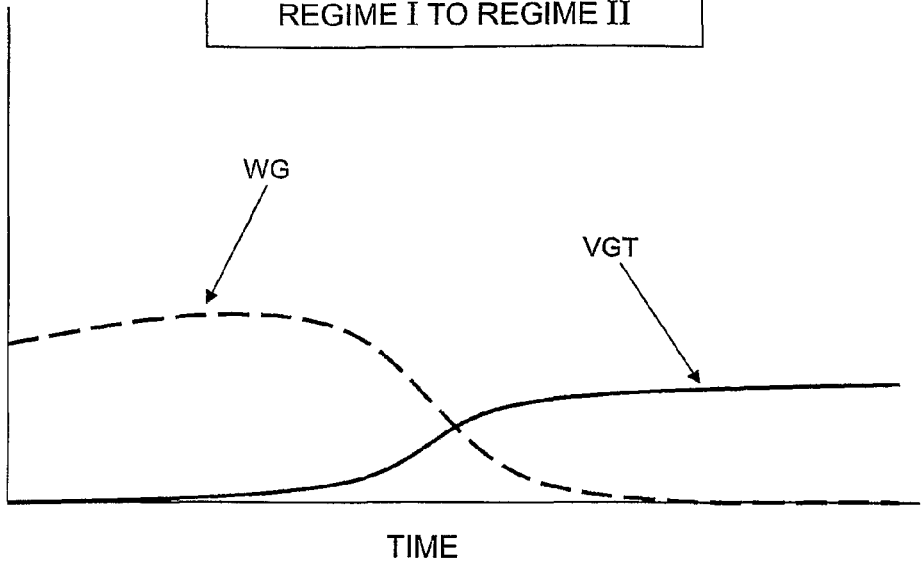
FIG. 3 is a graph schematically illustrating a transition from engine operating regime I to engine operating regime II in accordance with an embodiment of the invention.

In the transition region T1 between Regimes I and II, the variable-geometry mechanism and the waste gate are controlled in particular ways in order to accomplish a smooth transition as the variable-geometry mechanism begins to open for operation in Regime II. More particularly, as illustrated in FIG. 3, as the variable-geometry mechanism is initially moved from its fully closed position toward a more-open position, the waste gate simultaneously is moved from a relatively open position toward its closed position for operation in Regime II. This transition occurs, as shown in FIG. 2, at a predetermined engine speed for a given load, and the predetermined engine speed depends on engine load. Thus, in general, the transition occurs at a higher engine speed as load increases. However, various transition schemes can be used, and the illustrated one is presented merely for explanatory purposes. Although the applicant does not wish to be bound by theory, it is thought that positioning the waste gate in a relatively open position (i.e., not fully closed) at the moment that the variable-geometry mechanism begins to open serves to reduce the pressure of the exhaust gas entering the turbine via the variable-geometry mechanism and may reduce the amount of flow disturbance caused when the variable-geometry mechanism just begins to open. As the variable-geometry mechanism continues to open, the waste gate simultaneously can be closed.

In the transition region T2 between Regimes II and III, the variable-geometry mechanism is fully open and the waste gate is moved from its fully closed position toward a more-open position. Again, as shown in FIG. 2, this transition occurs at a predetermined engine speed for a given load, and the predetermined engine speed depends on engine load. In general, the transition occurs at a higher engine speed as load increases. However, various transition schemes can be used, and the illustrated one is presented merely for explanatory purposes.

In FIG. 2, the locus of engine load-engine speed points delimiting the upper end of Regime I is denoted "N1". For a given engine load, N1 is a predetermined engine speed at which the transition region T1 begins; thus, below N1, the variable-geometry mechanism is closed and the waste gate is used for regulating boost. The locus of engine load-engine speed points delimiting the upper end of Regime II is denoted "N2". For a given engine load, N2 is a predetermined engine speed at which the transition region T2 begins; thus, above N2, the variable-geometry mechanism is open and the waste gate is used for regulating boost. At speeds between N1 and N2, the waste gate is maintained in a relatively closed position and boost is regulated by regulating the position of the variable-geometry mechanism.

As shown in FIG. 2, there is also a predetermined engine speed (dependent on engine load) N1' that delimits the lower end of Regime II at which the transition region T1 begins when speed is decreasing. The speed N1' may or may not be equal to the speed N1 for a given engine load. Likewise, there is a predetermined engine speed (dependent on engine load) N2' that delimits the lower end of Regime III at which the transition region T2 begins when speed is decreasing. The speed N2' may or may not be equal to the speed N2 for a given engine load. As shown, N1 is somewhat higher than N1, and N2' is somewhat higher than N2.

The operation of the apparatus and method of the invention is now explained by reference to specific examples, which are presented for explanatory purposes only and are not intended to be limiting in any way. As a first example, and with reference to FIGS. 1 and 2, consider an acceleration of the engine from a relatively low-speed, low-load condition A in Regime I to a higher-speed, higher-load condition B in Regime II. Initially, at condition A, the variable-geometry mechanism 38 is closed and the waste gate 40 is regulating boost, under the control of the ECU 40. As speed and load increase to N1, the transition region T1 is encountered. The ECU 40 commands the variable-geometry mechanism to begin opening and simultaneously commands the waste gate to begin closing (see FIG. 3). The movement of each of the variable-geometry mechanism and the waste gate can be based on a predetermined function dependent on variables such as time, load, or speed, as stored in the ECU's memory, or can be at a predetermined fixed time rate of change stored in memory.

As a second example, consider moving from condition B to condition A in FIG. 2. Initially, at condition B, the waste gate 40 is closed and the variable-geometry mechanism 38 is regulating boost, under the control of the ECU 40. As speed and load decrease to N1', the transition region T1 is encountered. The ECU 40 commands the variable-geometry mechanism to begin closing and simultaneously commands the waste gate to begin opening (i.e., essentially the reverse of what is shown in FIG. 3). The movement of each of the variable-geometry mechanism and the waste gate can be based on a predetermined function dependent on variables such as time, load, or speed, as stored in the ECU's memory, or can be at a predetermined fixed time rate of change stored in memory.

Figure 4:
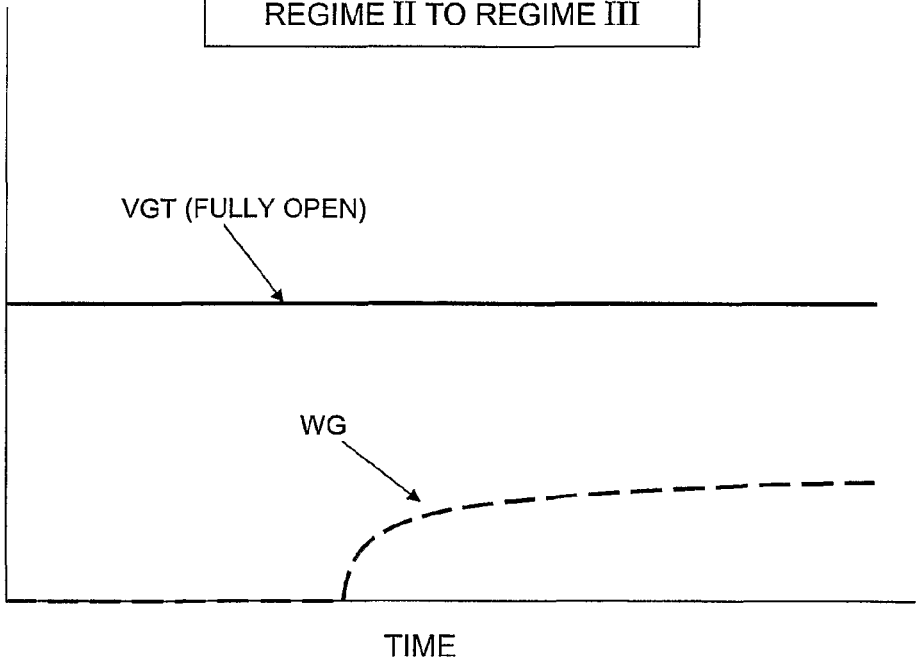
FIG. 4 is a graph schematically illustrating a transition from engine operating regime II to engine operating regime III in accordance with an embodiment of the invention.

As a third example, consider moving from condition B to a condition C in Regime III, at constant load with increasing speed. Initially, at condition B, the waste gate 40 is closed and the variable-geometry mechanism 38 is regulating boost, under the control of the ECU 40. As speed and load increase to N2, the transition region T2 is encountered. By the time N2 is reached, the variable-geometry mechanism is fully open, under the command of the ECU 40, and the ECU commands the waste gate to begin opening (see FIG. 4). The movement of the waste gate can be based on a predetermined function dependent on variables such as time, load, or speed, as stored in the ECU's memory, or can be at a predetermined fixed time rate of change stored in memory.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for controlling a variable-geometry turbocharger having a turbine comprising a turbine wheel mounted for rotation in a turbine housing, the turbine housing defining a chamber surrounding the turbine wheel for receiving exhaust gas from an engine and further defining a nozzle leading from the chamber generally radially inwardly to the turbine wheel through which exhaust gas flows from the chamber to the turbine wheel, the turbine including a variable-geometry mechanism that is movable to regulate flow through the nozzle, the turbine further comprising a waste gate movable between a closed position in which substantially all of the exhaust gas is directed from the engine through the turbine nozzle to the turbine wheel and a plurality of open positions differing from one another in degrees of openness for allowing a variable proportion of the exhaust gas to bypass the turbine, the method comprising the steps of:
   at engine speeds below a predetermined first speed N1, maintaining the variable-geometry mechanism in a relatively closed position and regulating boost of the turbocharger by regulating the position of the waste gate;
   at intermediate engine speeds between the first speed N1 and a higher predetermined second speed N2, maintaining the waste gate in a relatively closed position and regulating boost by regulating the position of the variable-geometry mechanism; and
   at engine speeds above N2, maintaining the variable-geometry mechanism in a relatively open position and regulating boost by regulating the position of the waste gate.

2. The method of claim 1, wherein when engine speed increases through N1, the waste gate is in a relatively open position and the variable-geometry mechanism begins to open while the waste gate begins to close.

3. The method of claim 1, wherein when engine speed increases through N2, the variable-geometry mechanism is in a relatively open position and the waste gate begins to open.

4. The method of claim 3, wherein at speeds above N2, the variable-geometry mechanism is in a fully open position.

5. The method of claim 1, wherein the variable-geometry mechanism is in an intermediate position between a fully closed position and a fully open position when engine speed is between N1 and N2.

6. A method for controlling a variable-geometry turbocharger having a turbine comprising a turbine wheel mounted for rotation in a turbine housing, the turbine housing defining a chamber surrounding the turbine wheel for receiving exhaust gas from an engine and further defining a nozzle leading from the chamber generally radially inwardly to the turbine wheel through which exhaust gas flows from the chamber to the turbine wheel, the turbine including a variable-geometry mechanism that is movable to regulate flow through the nozzle, the turbine further comprising a waste gate movable between a closed position in which substantially all of the exhaust gas is directed from the engine through the turbine nozzle to the turbine wheel and a plurality of open positions differing from one another in degrees of openness for allowing a variable proportion of the exhaust gas to bypass the turbine, the method comprising the steps of:

during a low-speed operating regime I defined below a predetermined engine speed N1, regulating boost provided by the turbocharger by regulating the position of the waste gate while maintaining the variable-geometry mechanism in a closed position;

during a higher-speed operating regime II defined above a predetermined engine speed N1' and below a predetermined engine speed N2, where N1' is higher than N1 and N2 is higher than N1', regulating boost by regulating the position of the variable-geometry mechanism while maintaining the waste gate in a fixed position; and during a speed increase from regime I into regime II, as engine speed increases through a transition region T1 defined from N1 to N1', positioning the waste gate in an open position and beginning to open the variable-geometry mechanism while moving the waste gate toward the closed position.

7. The method of claim 6, wherein the waste gate is fixed in a fully closed position during the operating regime II.

8. The method of claim 6, further comprising:

during a still higher-speed operating regime III defined above a predetermined engine speed N2', where N2' is higher than N2, regulating boost by regulating the position of the waste gate while maintaining the variable-geometry mechanism in a fixed position.

9. The method of claim 8, wherein the variable-geometry mechanism is fixed in a fully open position during the operating regime III.

* * * * *